United States Patent [19]
Kwok et al.

[11] Patent Number: 6,091,477
[45] Date of Patent: *Jul. 18, 2000

[54] SINGLE POLARIZED LCD CONSISTING OF PARTICULAR TWIST ANGLE AND THICKNESS-BIREFRINGENCE PRODUCT

[75] Inventors: Hoi Sing Kwok, Hkust; Shu Tuen Tang, Shatin, both of The Hong Kong Special Administrative Region of the People's Republic of China

[73] Assignee: The Hong Kong University of Science & Technology, The Hong Kong Special Administrative Region of the People's Republic of China

[ * ] Notice: This patent issued on a continued prosecution application filed under 37 CFR 1.53(d), and is subject to the twenty year patent term provisions of 35 U.S.C. 154(a)(2).

[21] Appl. No.: 08/826,815

[22] Filed: Mar. 25, 1997

[51] Int. Cl.[7] .............................. G02F 1/1335; G02F 1/13
[52] U.S. Cl. ........................... 349/180; 349/181; 349/96; 349/113
[58] Field of Search .............................. 349/96, 113, 117, 349/121, 180, 181

[56] References Cited

U.S. PATENT DOCUMENTS

| | | | |
|---|---|---|---|
| 3,912,369 | 10/1975 | Kashnow | 349/117 |
| 4,609,255 | 9/1986 | Leenhouts et al. | 349/181 |
| 4,652,088 | 3/1987 | Kando et al. | 349/181 |
| 4,759,612 | 7/1988 | Nakatsuka et al. | 349/181 |

FOREIGN PATENT DOCUMENTS

| | | | |
|---|---|---|---|
| 4-141630 | 5/1992 | Japan | 349/113 |

OTHER PUBLICATIONS

Kwok, H.S., "Parameter space representation of liquid crystal display operating modes." *J. Appl. Phys* 80(7), Oct. 1, 1996, pp. 3687–3693.

*Primary Examiner*—Willaim L. Sikes
*Assistant Examiner*—Toan Ton
*Attorney, Agent, or Firm*—Burns, Doane, Swecker & Mathis, L.L.P.

[57] ABSTRACT

A liquid crystal display is described in which the need for a conventional output polarizer is eliminated and the display comprises only a liquid crystal cell, a single input polarizer, a reflector placed behind the cell, and a retardation film placed between the reflector and the cell. A Jones matrix simulation approach is used in order to obtain the parameters corresponding to solution spaces for the above design and several combinations are disclosed that give good results.

6 Claims, 7 Drawing Sheets

100ms/div

SINGLE POLARIZED LCD CONSISTING OF PARTICULAR TWIST ANGLE AND THICKNESS-BIREFRINGENCE PRODUCT

FIELD OF THE INVENTION

This invention relates to a liquid crystal display (LCD), and in particular to such a display in which the output polarizer is eliminated.

BACKGROUND OF THE INVENTION

Liquid crystal displays are widely used in commercial products. As is well known liquid crystals are organic liquids consisting of long-chain molecules that line up and have a quasi-crystalline structure. A change in the applied voltage changes the orientation of the liquid, and with the appropriate polarizers, the transmission or reflection can change substantially. Liquid crystal displays can be viewed in transmission, with backlighting, or in reflection with ambient light. However, in both cases the operation of the display is the same. The liquid crystal cell is sandwiched between two polarizers which are appropriately orientated to produce the on or off transmission of light. For reflective viewing, the light simply travels through the LCD twice with the help of a mirror, plus possibly a light diffuser, placed in the back of the display. Thus, the LCD viewed in reflection is simply two tandem transmissive displays. Such an arrangement has a number of disadvantages and is relatively complex in the number of components required.

PRIOR ART

In addition to twisted nematic LCDs, non-twisted nematic systems have also been investigated for producing reflective displays. For example, reflective displays based on cholesteric liquid crystals (W. D. St. John, W. J. Fritz, Z. J. Lu and D. K. Yang, *Phys. Rev.* E51, 1191 (1995)) or on scattering of light (T. Uchida, T. Nakayama, T. Miyashita, M. Suzuki and T. Ishinabe, paper S24-1, *Asia Display, Proc. of the* 15th International Display Research Conference, Society for Information Displays, 1995) have been proposed. These systems do not require any polarizers at all. However, the driving schemes are nontraditional and the manufacturing of such displays is not entirely compatible with conventional twisted nematic (TN) and supertwisted nematic (STN) displays.

T. Sonehara and O. Okumura, paper 7-6, Japan Display, Proc. of the 9th International Display Research Conference, Society for Information Displays, 1989, proposed a simple reflective display with just an input polarizer and a rear mirror. For some unique combinations of twist angle and liquid crystal birefringence, they were able to obtain such a reflective display. However, the dispersion and contrast ratios were found to be very poor. More recently a reflective display where a retardation film was placed between the input polarizer and the liquid crystal cell has been proposed, I. Fukuda, M. Kitamura and Y. Kotani, paper P3.5-3, Asia Display, Proc. of the 15th International Display Research Conference, Society for Information Displays, 1995. By this method improvements were made to the colour dispersion and the contrast was acceptable. However, to achieve these results the requirements on the retardation film are very stringent and optimization is difficult to achieve.

SUMMARY OF THE INVENTION

It is an object of the present invention to provide a reflective liquid crystal display in which the rear polarizer is not needed.

According to the present invention there is provided a liquid crystal display comprising a liquid crystal cell, a single polarizer placed in front of said cell, a reflector placed behind said cell, and a retardation film placed between said and said cell.

Results indicate that such a liquid crystal display will provide results that are as good as conventional designs with the appropriate choice of twist angle and birefringence of the liquid crystal cell. Preferably the twist angle is 45°, 135°, 225° or 315° (in each case ±10°) and for each of these twist angles a number of birefringence values are possible that will achieve good results.

Appropriate selection of the orientation of the retardation film allows either a normally dark or a normally bright display to be obtained as desired.

In particular if the angle ($\chi$) between the fast axis of the retardation film and the input director of the liquid crystal cell is chosen such that $\chi=0°$ a normally dark display may be obtained. However a normally bright display may be obtained by setting $\chi=45°$.

Such a display has a number of advantages over conventional LCD designs. It has one less optical element, ie the rear polarizer, that can cause absorption loss and dispersion. Potentially such a reflective display is also simpler to manufacture than conventional displays. Moreover the rear mirror may be placed on the inside of the cell in place of the ITO (indium tin oxide) electrodes. For example, if the mirror is made of aluminium it may be used as both the electrode and the mirror. This arrangement can reduce the parallax and shadowing of the image when viewed at an oblique angle.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

Figure 1:
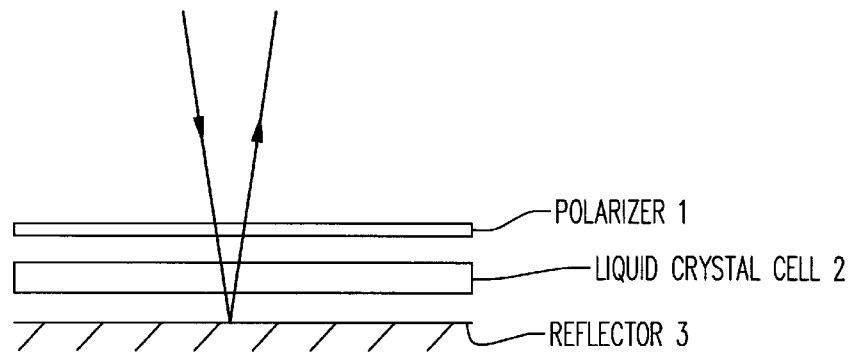
FIG. 1 is a schematic view of a LCD according to an embodiment of the invention.

Referring firstly to FIG. 1 there is shown schematically a liquid crystal display. In this display there are only three principal optical elements: a polarizer 1, a liquid crystal cell 2, and a reflector 3. The path of an incoming and reflected beam is shown by way of illustration. The reflectivity of such a display can be simulated by the Jones matrix. The Jones matrix formulation and the generalized geometric optics approximation (GGOA) have been fully described before: eg A. Lien, *J. Appl. Phys.* 67, 2853 (1990), H. L. Ong, *Proc. of SID*, 29, 161 (1988) and H. L. Ong, *J. Appl. Phys.* 62, 614 (1988). Details of the Jones matrix calculation of the parameter space can be found in H. S. Kwok, *J. Appl. Phys.*, 80,3687 (1996). These documents are incorporated by reference and the Jones matrix approach will not be described in detail here. The most important point to note, however, is that the liquid crystal director (the direction in which the molecules line up) is assumed to be uniform over the entire cell. In fact it is well known that the tilt angle decreases in the middle of the liquid crystal cell due to elastic energy minimization, especially for high pretilt angle cases. However it has been pointed out by Lien that an average tilt angle can be used without producing any significant error in predicting the properties of the LCD, and in simulations referred to in this specification the tilt angle is assumed to be zero.

Figure 2:
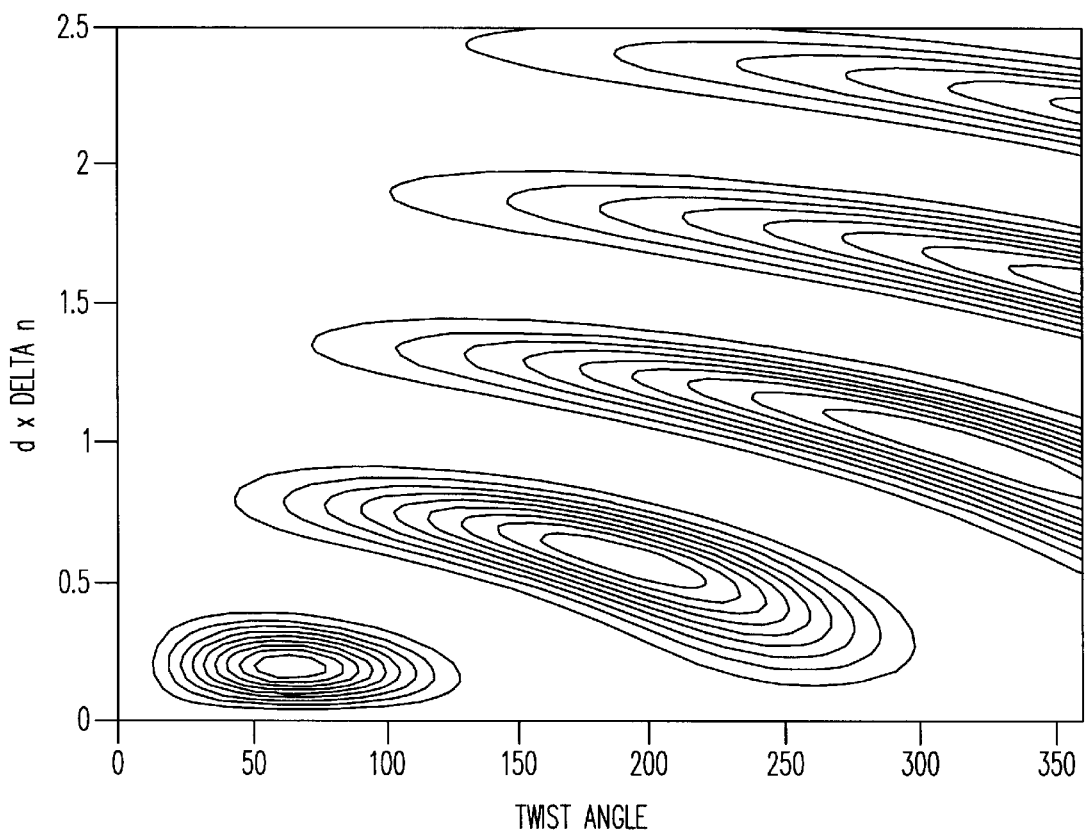
FIG. 2 is a contour plot showing the relationship between the twist angle and the birefringence for LCDs according to the invention.

Using the Jones matrix approach FIG. 2 is a contour plot for the reflection coefficient of the display of FIG. 1. In this plot the polarizer makes an angle ($\alpha$) of 0° to the input director of the liquid crystal cell, the wavelength ($\lambda$)=550 nm, and the twist angle ($\phi$) and d$\Delta$n (d=thickness of LC cell, $\Delta$n=birefringence of the LC) are the variable parameters. It can be seen from this simulation that within the parameters used there are three solutions where reflectivity=0 at no applied voltage. In FIG. 2 the contour lines are in steps of 10% and the x and y axes represent 100% reflectivity.

The solutions for zero reflectivity can actually be solved analytically and the values for $\phi$ and d$\Delta$n are given by:

$$\phi = (2N-1)\frac{\pi}{2\sqrt{2}} \quad (1)$$

and $$d\Delta n = (2N-1)\frac{\lambda}{2\sqrt{2}} \quad \text{for } N = 1, 2, 3, \ldots \quad (2)$$

From (1) and (2) the first two operating points of this reflective display are ($\phi$, d$\Delta$n)=(63.6°, 0.194 $\mu$m) and (190.8°, 0.583 $\mu$m) at $\lambda$=550 nm respectively. These values agree well with the results of FIG. 2.

Figure 3:
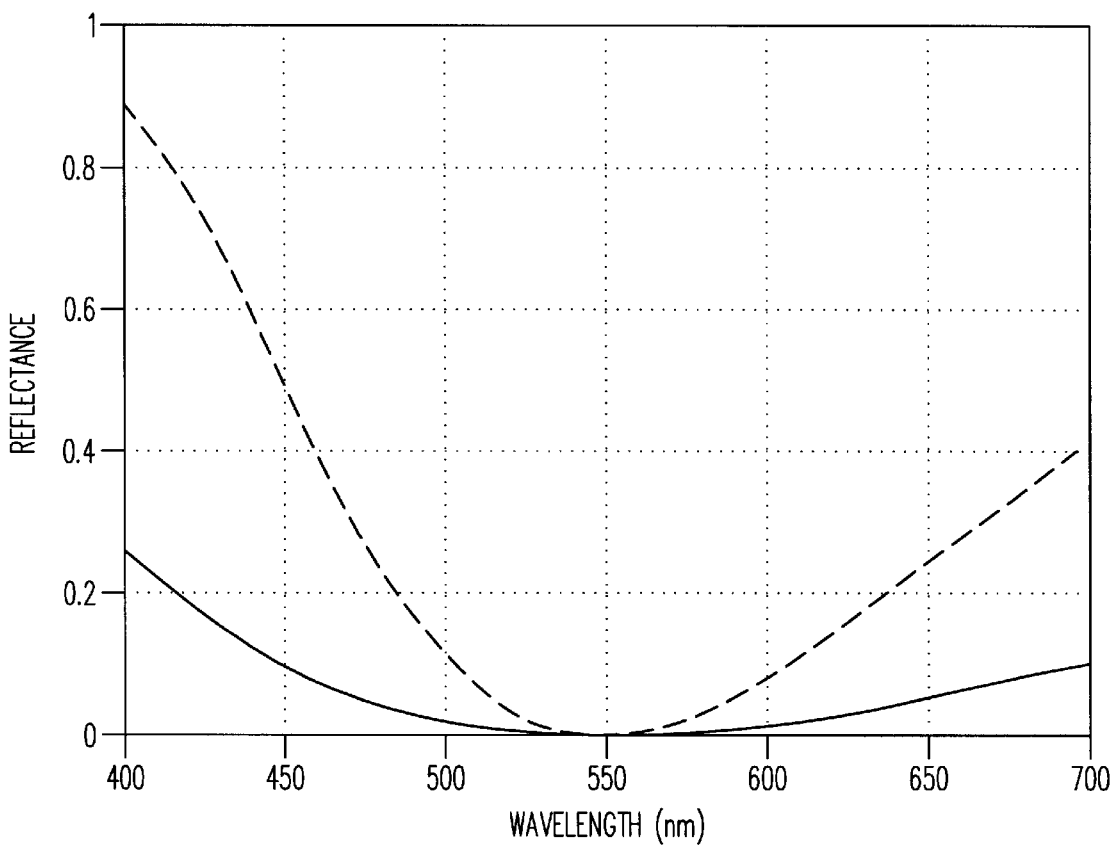
FIG. 3 is a plot showing the reflectance as a function of wavelength.

However this simple display is rather dispersive. The reflectivity of the display at the two operating conditions mentioned above is plotted in FIG. 3 and from this it can be seen that a small change in $\lambda$ induces a large change in reflectivity. The 63.6° cell is the better of the two, but unfortunately d$\Delta$n=0.194 $\mu$m is in practice difficult to achieve.

Figure 4:
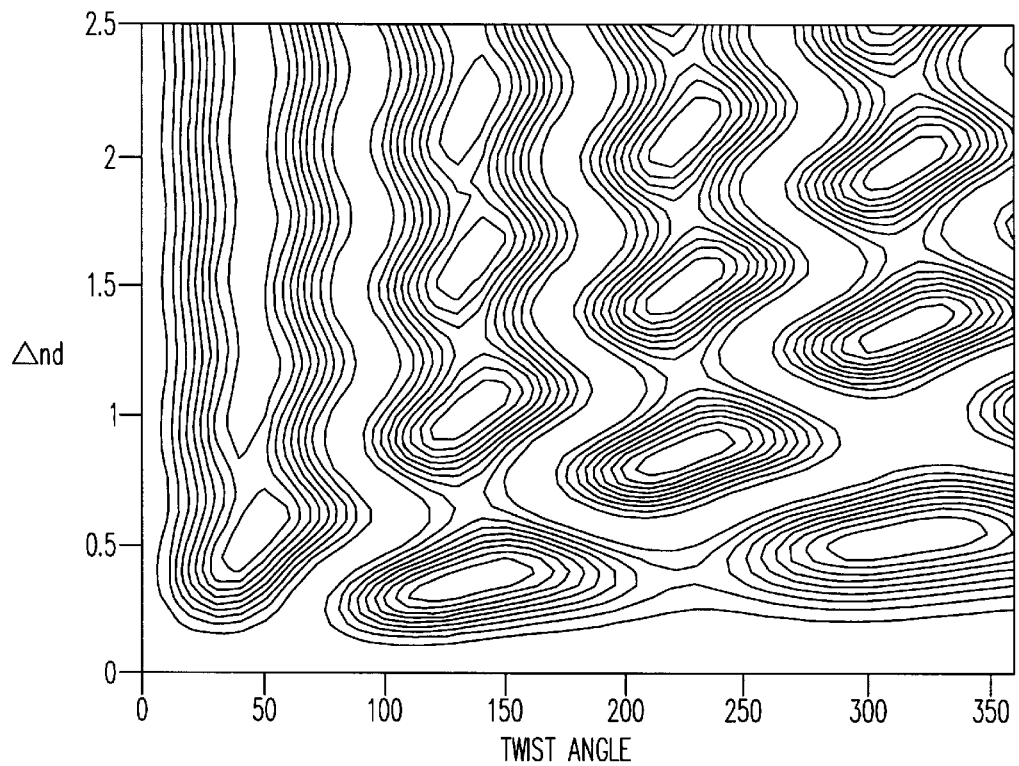
FIG. 4 is a plot similar to FIG. 2 but of a normally dark display embodiment with a retardation plate.
Figure 12:
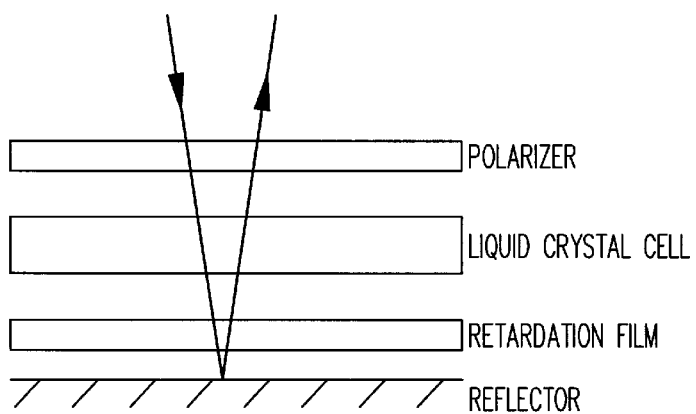
FIG. 12 is a schematic view of an LCD which includes a retardation film.

This undesirable colour dispersion may be reduced by placing a retardation film between the rear mirror 3 and the liquid crystal cell 2. FIG. 4 shows a contour, as shown in FIG. 12 plot of solutions for this display. The angle $\alpha$ is taken to be zero, as also is the angle ($\chi$) that the fast axis of the retardation film makes to the input director of the liquid crystal cell. Again $\lambda$=550 nm. The retardation is chosen to be $\pi/4$ for all wavelengths (ie a quarter waveplate). These parameters correspond to a normally dark display. If the voltage is increased d$\Delta$n will decrease and eventually become zero (homeotropic state). This corresponds to the x-axis in FIG. 4. For $\chi$=0° the x-axis corresponds to 100% reflectivity therefore the voltage off state should have 0% reflectivity (normally off), and it can be seen that there are four groups of solutions for this to occur. They are at twist angles of approximately 45°, 135°, 225° and 315° (±10°) and correspond to the "islands" marked 10 in FIG. 4 and optimum values exist at these angles where the product d$\Delta$n is larger than 0.5 $\mu$m, 0.3 $\mu$m, 0.8 $\mu$m and 0.5 $\mu$m respectively.

Figure 5:
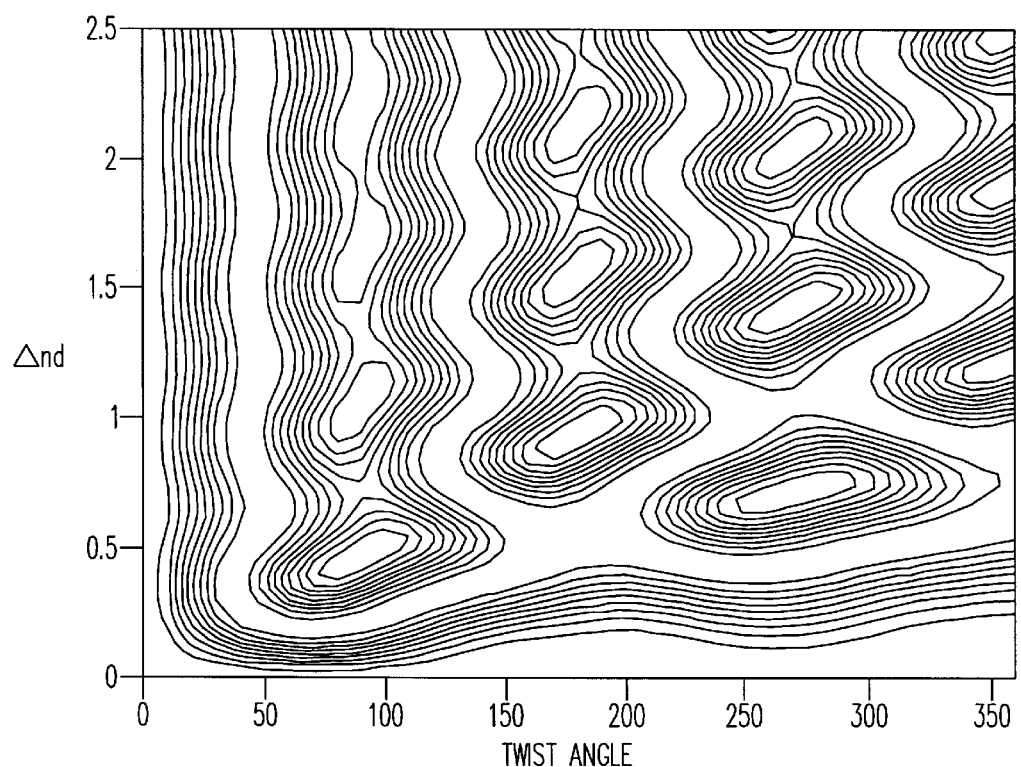
FIG. 5 is a plot similar to FIG. 4 but with a different orientation of the retardation plate forming a normally bright display.

The display can also be arranged in a normally bright configuration. This can be achieved by rotating the quarter-wave plate by 45°. FIG. 5 shows the solutions for such a display with $\chi$=45°. For this case the voltage off state should have 100% reflectivity and the x-axis corresponds to 0% reflection. Again four solutions occur, and at the same twist angles as for normally dark displays, ie 45°, 135°, 225° and 315° (again ±10°) and correspond to the connected area 20 in FIG. 5.

Figure 6:
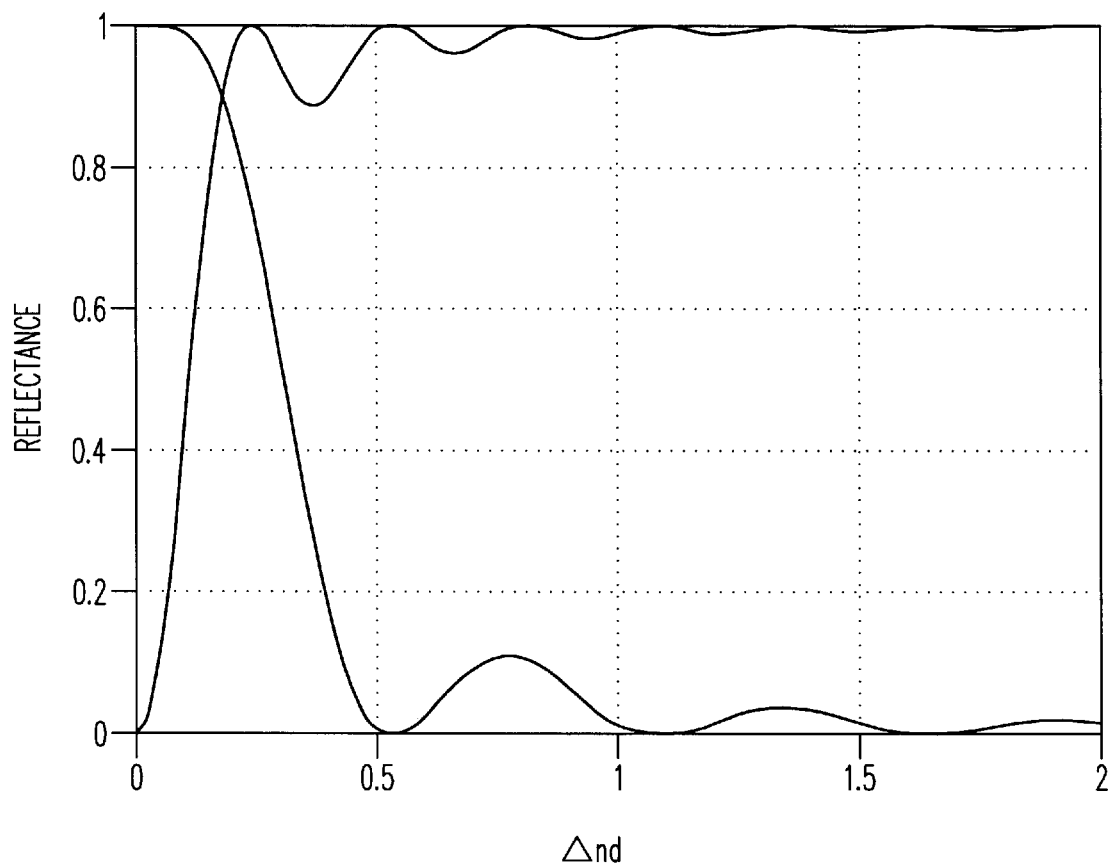
FIG. 6 is a plot showing the reflectance as a function of birefringence.

In all solutions for both the normally dark and normally bright displays, the Mauguin behaviour as in 90° TN display is present, namely as d$\Delta$n increases there are a few Mauguin minima, and eventually the waveguiding or adiabatic limit is reached at large $\Delta$n. FIG. 6 shows the case for a 45° display for both normally dark and normally bright arrangements. The reflectivity is plotted as a function of $\Delta$n. It can be seen that the behaviour of the reflectivity curve is quite similar to the case of transmission displays with a series of Mauguin minima (or maxima for the normally dark case) with the waveguiding limit at large (>2 $\mu$m) d$\Delta$n.

Figure 7:
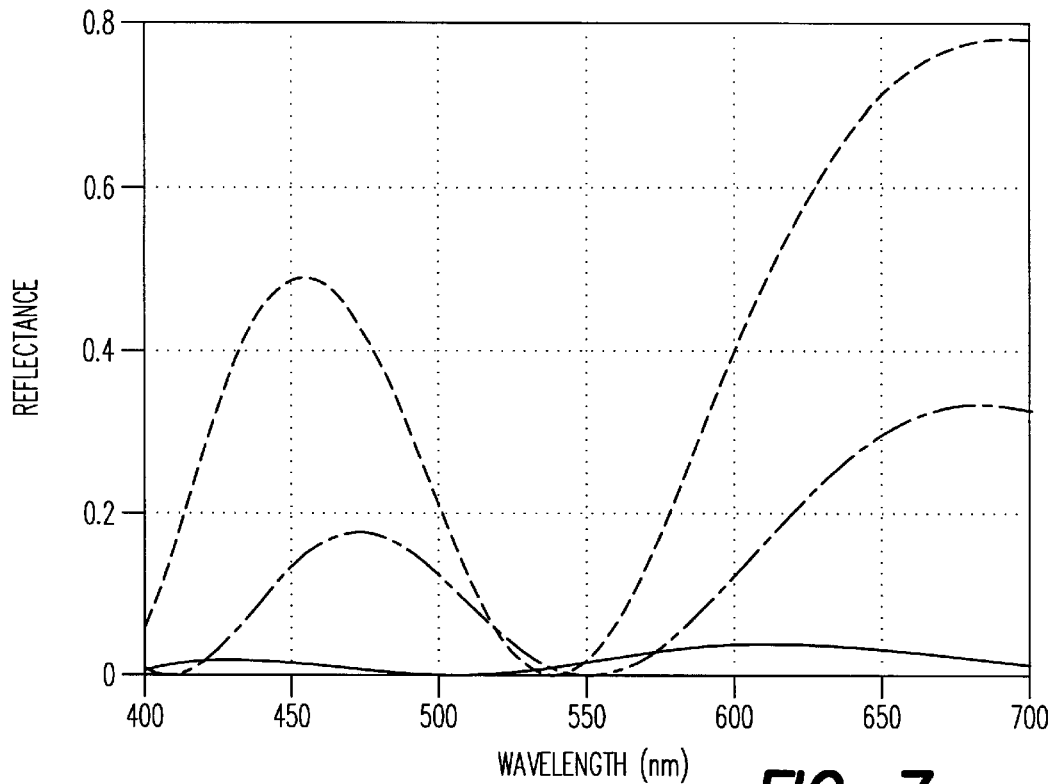
FIG. 7 is a plot showing reflectivity versus wavelength for a number of possible arrangements for normally dark displays.
Figure 8:
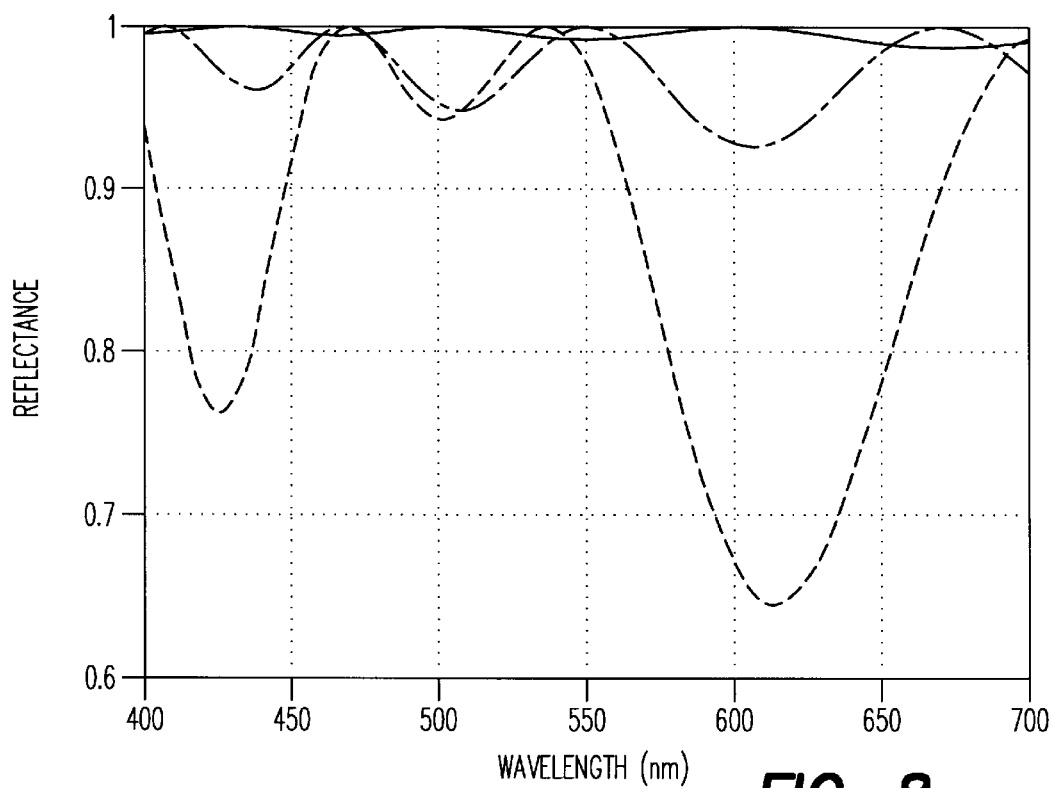
FIG. 8 is a view similar to FIG. 1 but for normally bright displays.

FIG. 7 shows the dispersion of the reflectivity versus wavelength for the third minimum for the 45° (solid line), 135° (long-short broken line) and 225° (long-long broken line) normally dark displays. It can be seen that the 45° case has the best dispersion characteristics. FIG. 8 is a view corresponding to FIG. 7 but for normally bright displays, again at 45° (solid line), 135° (long-short broken line) and 225° (long-long broken line). Again the 45° case has only a 1% variation in reflectivity while the 135° has a 5% variation and the 225° a variation of about 35%. These results indicate that the 45° displays are well suited to replacing conventional TN displays, while the 135° and 225° can be a good replacement for ordinary STN LCDs.

Figure 9:
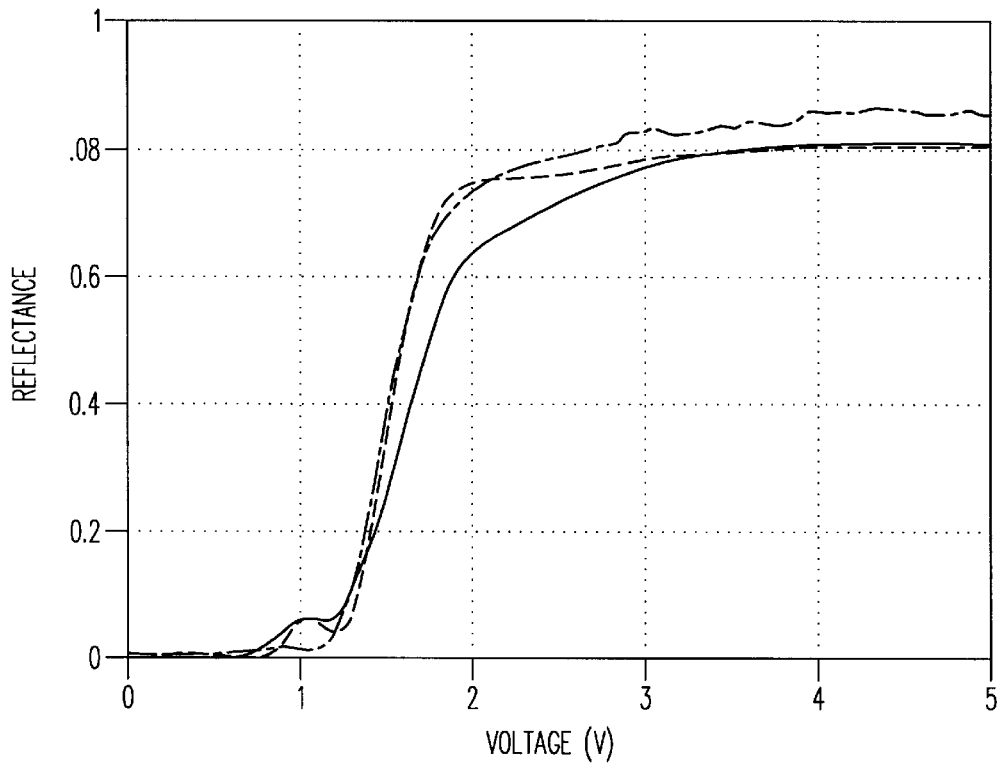
FIG. 9 shows reflectivity as a function of driving voltage.

As a practical embodiment of the invention a 45° twist liquid cell was fabricated. The cell gap (d) was 7 $\mu$m while d$\Delta$n=1.2 $\mu$m. This cell corresponds to the second minimum of FIG. 5. The experimental arrangement for the measurement of the reflectivity included a beam-splitter to reflect the reflected light onto a detector. Absolute calibration of the reflectance was obtained by replacing the LCD cell with a mirror. FIG. 9 shows the measured reflectivity as a function of the driving square wave voltage for three different wavelengths (red 633 nm, green 516 nm and blue 456 nm). From these results it can be seen that there is very little variation as a function of colour and that the no voltage dark state has a transmission below 1%. Switching to the bright state occurs at a threshold voltage 1.4 V which is similar to a conventional 90° TN LCD. It can also be seen that a maximum reflectance of over 80% can be achieved at 5 V. This reflectance increases to 90% at 7 V. Thus the contrast ratio for this display is over 100:1.

The slight decrease in reflectivity at 1.25 V is consistent with the results of FIG. 6. Since the present cell corresponds to the second Mauguin minimum it has to go through the first minimum before reaching the homeotropic state. Finally, all the curves in FIG. 9 are substantially identical implying that there is little wavelength dependence and this is consistent with FIG. 7.

Figure 10:
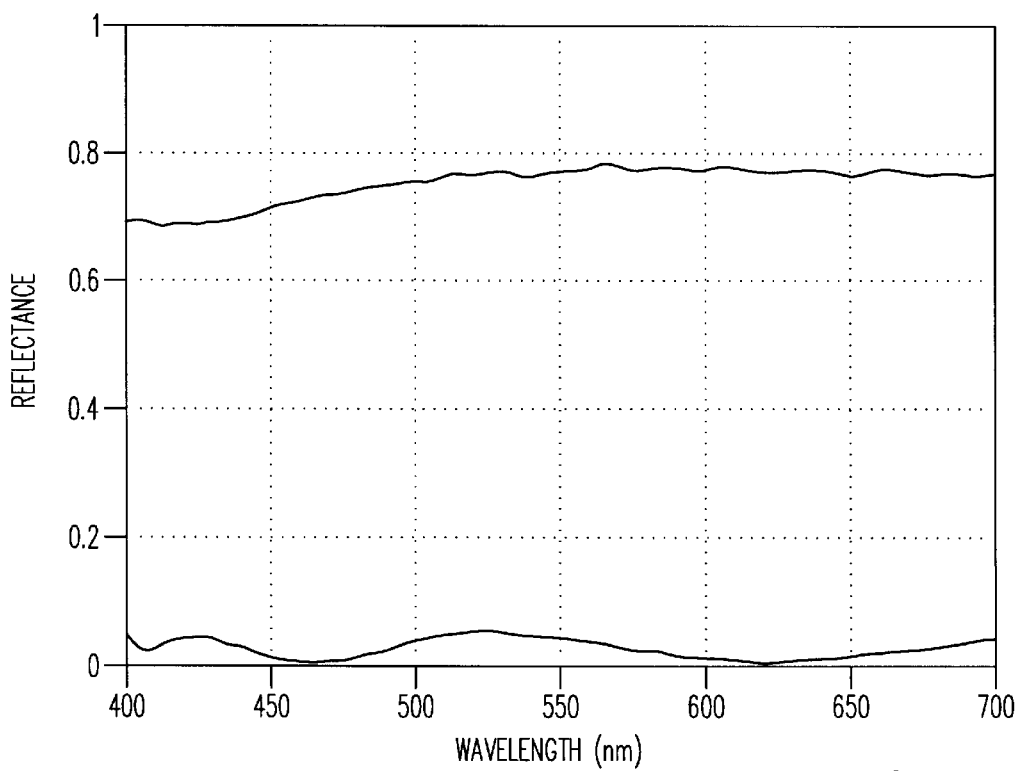
FIG. 10 shows the reflectance spectra for applied voltages of 0 V and 5 V.

To further confirm the wavelength dispersion property of this display the entire reflection spectrum was measured with a spectrometer. The results are shown in FIG. 10 in which spectra are shown for 0 V—the off state—(the lower line) and 5 V—the on state—(the upper line). It can be seen that both the on and off states are substantially wavelength independent in the visible region of the spectrum. Thus no additional colour compensation is necessary for making a black and white display and a full colour display can be made by the addition of appropriate filters.

Figure 11:
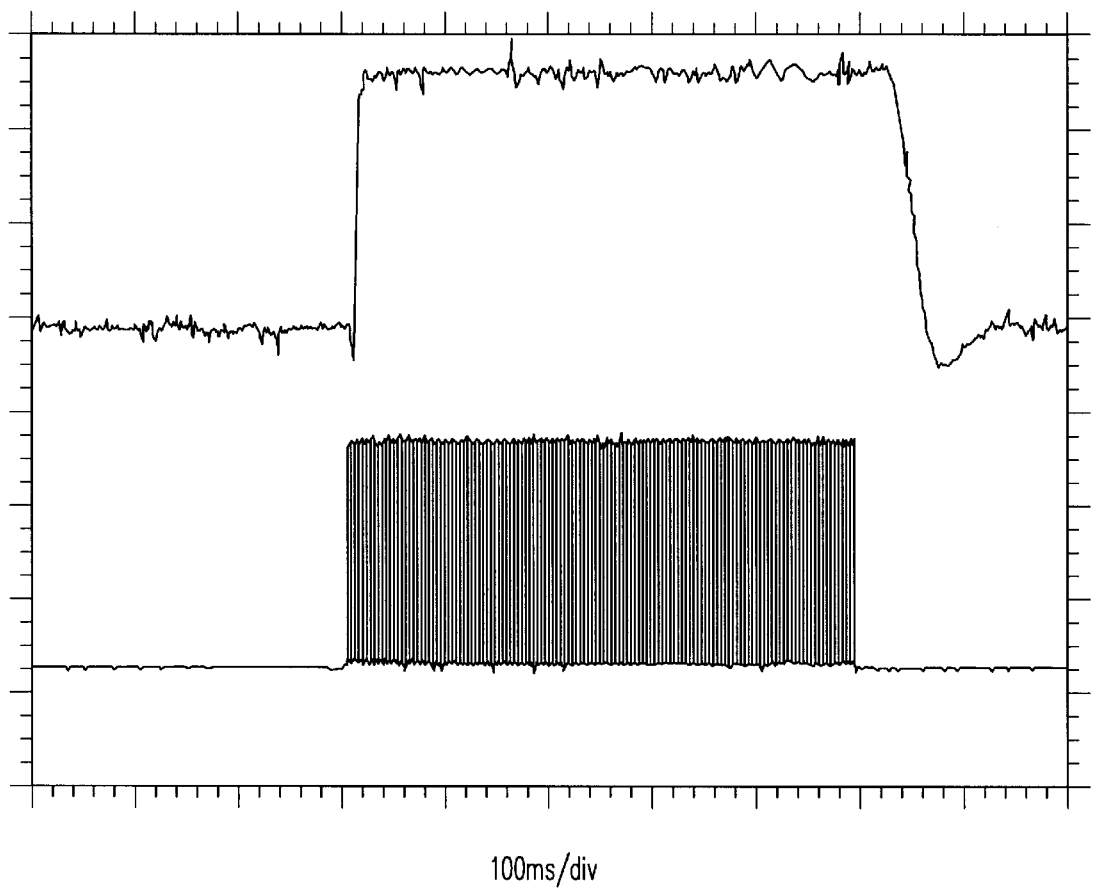
FIG. 11 shows the effect of applying a voltage pulse to illustrate the speed of the display.

The response time of this 45° TN display was also measured and FIG. 11 shows the result of applying a voltage pulse (5 V) to the display. The rise time of the transmitted light is about 5 ms while the falltime is about 30 ms. These values are fast compared to conventional 90° TN LCDs.

It will thus be seen that by means of the present invention it is possible to manufacture an LCD having only a single polarizer which nonetheless has properties at least the equal of, and in some cases better than, conventional LCDs. Thus simpler cheaper LCDs can be manufactured while still being of a sufficiently high standard for practical applications. The novel displays have low wavelength dependence, high contrast ratios and high speed. Since the voltage requirements and characteristics of the novel displays are comparable to conventional LCDs they can be easily accommodated into existing designs.

What is claimed is:

1. A liquid crystal display consisting essentially of a liquid crystal cell, a single polarizer placed in front of said cell, a reflector placed behind said cell, and a retardation film provided between said reflector and said cell, wherein a is 45°±10° and a product dΔn of said liquid crystal cell is larger than 0.5 μm and less than 2.5 μm.

2. A liquid crystal display consisting essentially of a liquid crystal cell, a single polarizer placed in front of said cell, a reflector placed behind said cell, and a retardation film provided between said reflector and said cell, where the twist angle is 135°±10° and the thickness-birefringence product dΔn of said liquid crystal cell is larger than 0.3 μm and less than 2.5 μm.

3. A liquid crystal display consisting essentially of a liquid crystal cell, a single polarizer placed in front of said cell, a reflector placed behind said cell, and a retardation film provided between said reflector and said cell, wherein the twist angle is 225°±10° and the thickness-birefringence product dΔn of said liquid crystal cell is larger than 0.8 μm and less than 2.5 μm.

4. A liquid crystal display consisting essentially of a liquid crystal cell, a single polarizer placed in front of said cell, a reflector placed behind said cell, and a retardation film provided between said reflector and said cell, wherein the twist angle is 315°±10° and the thickness-birefringence produce dΔn of said liquid crystal cell is larger than 0.5 μm and less than 2.5 μm.

5. A display as claimed in any of claims 1 to 4 wherein an ($\chi$) between a of said retardation film and a on the side of the liquid crystal cell through which light first enters is chosen such that $\chi=0°$ whereby said display is normally dark.

6. A display as claimed in any of claims 1 to 4 wherein an ($\chi$) between a of said retardation film and a on the side of the liquid crystal cell through which light first enters is chosen such that $\chi=45°$ whereby said display is normally bright.

* * * * *